No. 841,390. PATENTED JAN. 15, 1907.
A. GULLICKSON.
PLOW.
APPLICATION FILED OCT. 22, 1906.

Witnesses.
E. W. Jeppesen,
N. D. Kilgore.

Inventor.
Andrew Gullickson.
By his Attorneys
Williamson & Merchant

UNITED STATES PATENT OFFICE.

ANDREW GULLICKSON, OF GATZKE, MINNESOTA.

PLOW.

No. 841,390.　　　Specification of Letters Patent.　　　Patented Jan. 15, 1907.

Application filed October 22, 1906. Serial No. 339,980.

*To all whom it may concern:*

Be it known that I, ANDREW GULLICKSON, a citizen of the United States, residing at Gatzke, in the county of Marshall and State of Minnesota, have invented certain new and useful Improvements in Plows; and I do hereby declare the following to be a full, clear, and exact description of the invention, such as will enable others skilled in the art to which it appertains to make and use the same.

My invention relates especially to breaking-plows, and especially to those intended for use in hilly countries, and has for its object to provide certain improvements in the moldboards with a view of securing increased efficiency.

In plowing in a hilly country it is often necessary to plow across the side of a hill with the landside of the plow toward the bottom of the hill, in which case the furrows would have to be turned uphill. With the plows now in use in plowing across the side of a hill, as just described, the furrow, instead of turning over, will often fall back again into its original position, making it necessary for the driver to stop his team and turn the furrow over by hand, thus making a great deal of hard work, besides causing much delay.

To the above ends the invention consists of the novel devices and combinations of devices hereinafter described, and defined in the claims.

The invention is illustrated in the accompanying drawings, wherein like characters indicate like parts throughout both the views.

Figure 1:
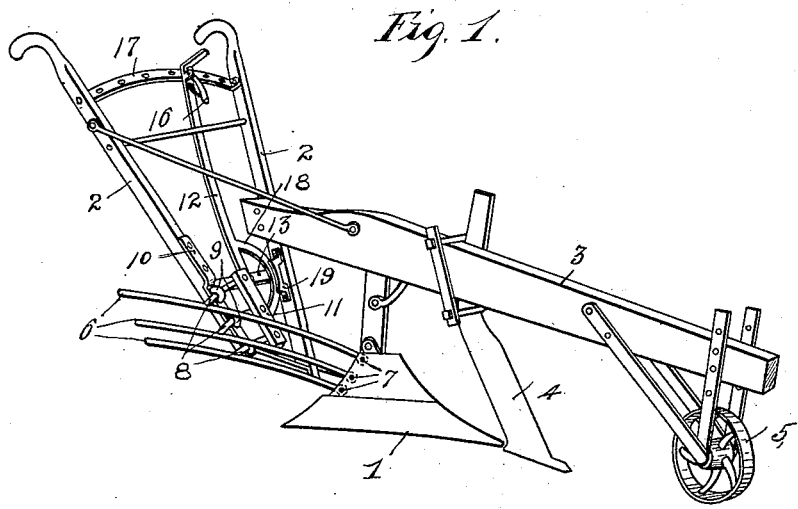
Figure 2:
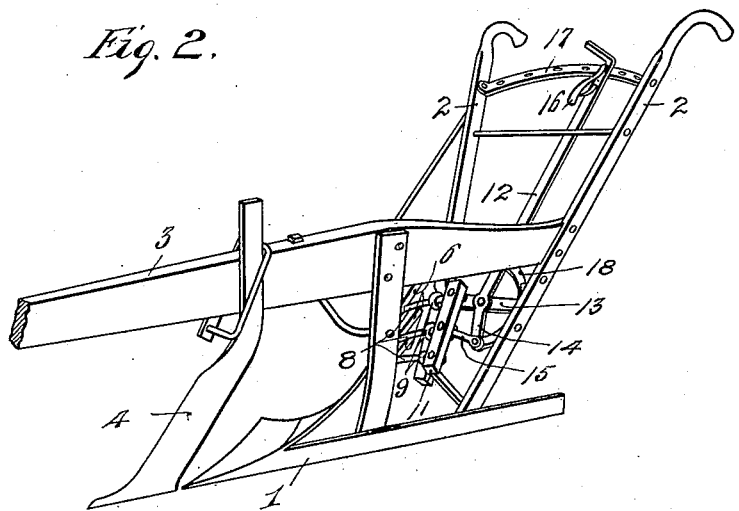

Referring to the drawings, Figure 1 is a perspective view of the improved plow looking at the right side thereof with the forward portion of the beam broken away, and Fig. 2 is a perspective view of the improved plow looking at the right side thereof with the forward portion of the beam broken away.

The numeral 1 indicates the plow, 2 the handle-bars, 3 the beam, 4 the standing colter, and 5 the gage-wheel, which are of the ordinary or standard construction.

Rods 6, constituting an adjustable moldboard extension, are pivotally attached to the moldboard of the plow 1 by short bolts or rivets 7. It may be here stated that the moldboard extension is, as shown, preferably constructed of rods, but, if desired, may be made of a single piece of metal. Each rod 6 is provided with a laterally-extended stem 8, which works through a bearing-lug 9, formed on a strap 10, secured to the right-hand handle-bar 2. The projecting end of each stem 8 is riveted to a tie-bar 11.

A latch-lever 12 is pivotally mounted on a brace 13, secured to the inside of handle-bars 2. The lower end of said latch-lever 12 is provided with an arm-like extension 14. A link 15 connects the lower end of the lever 14 with the central portion of the tie-bar 11. A spring-pressed latch 16, mounted in the upper end of the latch-lever 12, has locking engagement with a latch-bar 17, secured to the upper portion of the handle-bars 2. The latch-lever 12 is provided with a segmental brace 18, struck on a circle from the pivot-point of said latch-lever 12. Said segmental brace 18 works in a grooved keeper 19, secured to the left-hand handle-bar 2.

As is evident, in ordinary plowing the latch-lever 12 would be set in its extreme right-hand position, in which position the moldboard extension would be moved out of working position; but when plowing on the side of a hill, as previously described, the latch-lever 12 would be moved toward the left, and no matter how steep the hill was the furrow would be positively turned over by said moldboard extension.

The device above described has been put into actual use and has proven extremely efficient for the purpose had in view.

What I claim is—

1. The combination with a plow, having an adjustable moldboard extension, of a lever pivotally supported by the plow handle-bars and connected to said adjustable moldboard extension, substantially as described.

2. The combination with a plow having a moldboard and handle-bars, of an adjustable moldboard extension made up of rods hinged to said moldboard, laterally-extended stems secured to said rods, a lever mounted on said handle-bars, and means for connecting said rods to said lever, substantially as described.

3. The combination with a plow having a moldboard and handle-bars, of an adjustable moldboard extension made up of rods independently pivoted to said moldboard, laterally-extended stems secured to said rods, bearings secured to one of said handle-bars for guiding said stems, a tie-bar secured to the projecting ends of said stems, a latch-lever pivoted between said handle-bars, and a link connecting said tie-bar with said latch-lever, substantially as described.

In testimony whereof I affix my signature in presence of two witnesses.

ANDREW GULLICKSON.

Witnesses:
    JOHN HANGER,
    THEO. B. TORKELION.